United States Patent [19]

Fletcher et al.

[11] 3,757,568

[45] Sept. 11, 1973

[54] COMPRESSION TEST ASSEMBLY

[76] Inventors: James C. Fletcher, Administrator of the National Aeronautics and Space Administration with respect to an invention of; Anthony H. Kariotis, Tallmadge, Ohio

[22] Filed: Feb. 25, 1972

[21] Appl. No.: 229,413

[52] U.S. Cl. ..................................... 73/94, 73/103
[51] Int. Cl. ............................................. G01n 3/04
[58] Field of Search ............................... 73/94, 103

[56] References Cited
UNITED STATES PATENTS

| | | | |
|---|---|---|---|
| 3,490,273 | 1/1970 | Warfield et al. | 73/94 X |
| 3,397,572 | 8/1968 | Stolz et al. | 73/94 |

*Primary Examiner*—Jerry W. Myracle
*Attorney*—John R. Manning et al.

[57] ABSTRACT

A compression test assembly for long, small diameter test specimens having first and second means which interfit in telescoping manner and respectively define first and second holes centered around the same longitudinal axis and having the same diameters. First and second end cap means receive opposite ends of the first and second means, respectively, and define third and fourth holes centered around the same longitudinal axis as the first and second holes. The test specimen when placed in the first and second holes has first and second ends which extend into the third and fourth holes when the first and second means are interfitted in telescoping manner, the diameter of the first, second, third and fourth holes being just sufficiently larger than the diameter of the test specimen to prevent binding. The test specimen is thereby automatically aligned and laterally supported when compressive force is applied to the end caps means and transmitted to the test specimen during testing.

7 Claims, 2 Drawing Figures

COMPRESSION LOADING

COMPRESSION LOADING

Patented Sept. 11, 1973

3,757,568

3,757,568

COMPRESSION TEST ASSEMBLY

ORIGIN OF THE INVENTION

The invention described herein was made in the performance of work under a NASA contract and is subject to the provisions of Section 305 of the National Aeronautics and Space Act of 1958, Public Law 85–568(72 Stat. 435; 42 U.S.C. 2457).

BACKGROUND OF THE INVENTION

1. Field of the Invention

The invention relates to a compression test assembly which prevents buckling of small diameter rigid specimens undergoing compression testing and permits attachment of extensometers for strain measurements.

2. Description of the Prior Art

There are apparatuses disclosed in the prior art relating to compression testing of metal specimens. For example, Ely U.S. Pat. No. 3,421,366 discloses a stress testing apparatus in which the compression test specimen is enclosed at its ends by adapters which contain the specimen in order that the specimen ends need not be threaded or otherwise attached to the compression test apparatus. However, applicant is not aware of prior art that discloses a compression test assembly similar to applicant's which prevents buckling of the test specimen during compression testing.

SUMMARY OF THE DISCLOSURE

This and other disadvantages and defects of the prior art are solved by applicant's invention which provides a compression testing assembly which is primarily concerned with preventing buckling of small diameter specimens during compression testing, in order to permit use of commercially available extensometers to measure strain. The test specimen is inserted into the holes defined by telescoping portions of the compression testing assembly and is secured therein by set screws. The holes defined by the telescoping portions have a diameter which is just sufficiently larger than the diameter of the specimen under test to avoid binding that might otherwise occur. The specimen is therefore supported axially during loading and column buckling is eliminated. The specimen extends beyond the ends of the telescoping portions of the assembly, and end caps are provided to enable support of the extended parts of the specimen at the load points and to assure axial alignment. The invention therefore enables measurement of strain over a specific gauge length during compression testing of small diameter specimens, and particularly provides (1) lateral support to prevent buckling, (2) extensometer attachment capability, and (3) automatic specimen alignment.

DETAILED DESCRIPTION OF THE INVENTION

Figure 1:
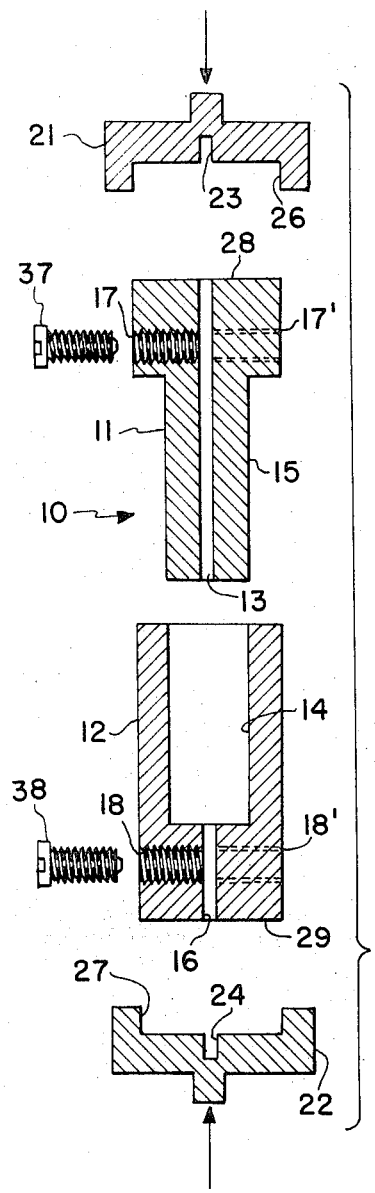
FIG. 1 is a sectional view in exploded form of the elements comprising the compression test assembly according to the invention.

The compression test assembly according to the invention is illustrated in FIG. 1. The compression test fixture body 10 comprises two interfitting telescoping elements 11 and 12. T-shaped essentially cylindrical element 11 defines a small diameter hole 13 centered about the longitudinal axis thereof for receiving the test specimen as explained hereafter. Cylindrical element 12 defines bore 14 centered about its longitudinal axis for receiving the shaft portion 15 of element 11. It further defines hole 16 centered about its longitudinal axis which has the same diameter as hole 13. The longitudinal axis of hole 16 is coincident with the longitudinal axis of hole 13.

Figure 2:
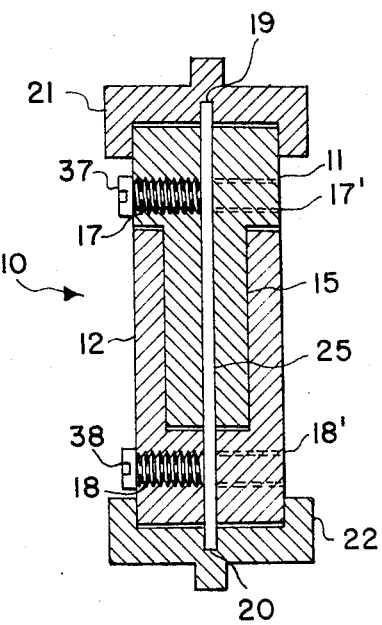
FIG. 2 is a sectional view of the elements comprising the compression test assembly with a specimen being shown under test.

The small diameter metal specimen 25 undergoing compression testing is inserted into the telescoping elements 11 and 12 of body 10 as shown in FIG. 2, wherein element 11 is shown as interfitted with element 12.

Each of elements 11 and 12 is provided with a set of three coplanar drilled and tapped openings disposed 120° apart about the circumference of the respective elements and extending to the centers thereof. One drilled and tapped opening is illustrated in each element and designated by reference numerals 17 and 18, respectively. Another drilled and tapped opening is shown in phantom in each element and designated, respectively, by reference numerals 17' and 18' with the third tapped opening in each element not being illustrated in the drawings. These tapped openings serve to receive two sets of set screws, one member of each set being shown in FIG. 1 and designated by reference numerals 37 and 38. Set screws 37 and 38 and the others, not shown, serve to secure test specimen 25 within the interfitting telescoping elements 11 and 12. The longitudinal distance between the two sets of set screws defines the gage length of the specimen 25.

As shown in FIG. 2, the test specimen 25 has a diameter which is slightly less than the diameter of holes 13 and 16 to avoid binding that otherwise might occur due to Poisson's ratio effect. The tested specimen is therefore supported axially during loading and column buckling is thereby eliminated. End caps 21 and 22 are essentially cylindrical in form and define a bored portion 26 and 27, respectively, which is of sufficient diameter to just receive end portions 28 and 29 of elements 11 and 12. This is shown in FIG. 2. The end caps 21 and 22 further define small holes 23 and 24, respectively, which are of equal diameter to the diameter of specimen 25. The ends of the specimen 19 and 20 which extend beyond the telescoping body 10 are received by holes 23 and 24 of end caps 21 and 22, respectively, as shown in FIG. 2. The compression loading of the assembly is applied to the end caps which provide support for the specimen at the load points and assure axial alignment thereof.

The present invention thereby prevents column buckling of long, small diameter metal specimens undergoing compression testing, and maintains the integrity of the components comprising the assembly.

We claim:

1. A compression test assembly for long, small diameter test specimens, comprising:

first and second means for interfitting in telescoping manner and respectively defining first and second holes centered around the same longitudinal axis and having the same diameters, first and second end cap means receiving opposite ends of the first and second means, respectively, and defining third and fourth holes centered around the same longitudinal axis as the first and second holes, the test specimen when placed in the first and second holes having first and second ends which extend into the third and fourth holes when the first and second means are interfitted in telescoping manner, the diameter of the first, second, third and fourth holes being just sufficiently larger than the diameter of the test specimen to prevent binding, whereby the test specimen may be automatically alined and laterally supported to permit compressive force to be applied to the end caps means and transmitted to the test specimen during compression testing of the specimen.

2. A compression test assembly as in claim 1 further comprising:
locking means defined by the first and second means for securely locking the test specimen in the first and second holes.

3. A compression test assembly as in claim 2 wherein the first and second ends of the test specimen are coupled to the first and second end cap means respectively for transmission of compressive force from the first and second means to the test specimen during testing.

4. A compression test assembly as in claim 2 wherein said locking means comprises a plurality of set screws for engaging said test specimen.

5. A compression test assembly as in claim 4 wherein said plurality of set screws consist of two sets of three set screws with one of said sets being disposed in each of said first and second means interfitting in telescoping manner.

6. A compression test assembly as in claim 5 wherein said first and second means interfitting in telescoping manner are cylindrical bodies and the three set screws making up each said set are coplanar and are disposed 120° from each other about the circumference of each said body.

7. The compression test assembly of claim 6 wherein the longitudinal distance between the two sets of set screws defines the gage length of the test specimen.

* * * * *